United States Patent
Zelesky

Patent Number: 5,800,124
Date of Patent: Sep. 1, 1998

[54] COOLED ROTOR ASSEMBLY FOR A TURBINE ENGINE

[75] Inventor: Mark F. Zelesky, Coventry, Conn.

[73] Assignee: United Technologies Corporation, Hartford, Conn.

[21] Appl. No.: 631,506

[22] Filed: Apr. 12, 1996

[51] Int. Cl.⁶ .................................................. F01D 5/08
[52] U.S. Cl. ............................................................ 416/95
[58] Field of Search ................................. 416/95, 96 R

[56] References Cited

U.S. PATENT DOCUMENTS

| | | | |
|---|---|---|---|
| 2,988,325 | 6/1961 | Dawson | 253/39.15 |
| 3,768,924 | 10/1973 | Corsmeier et al. | 416/95 |
| 3,989,410 | 11/1976 | Ferrari | 415/115 |
| 4,265,590 | 5/1981 | Davies | 415/110 |
| 4,348,157 | 9/1982 | Campbell et al. | 416/95 |
| 4,439,107 | 3/1984 | Antonellis | 416/95 |
| 4,505,640 | 3/1985 | Hsing et al. | 416/97 |
| 4,626,169 | 12/1986 | Hsing et al. | 416/95 |
| 4,820,116 | 4/1989 | Hovan et al. | 415/115 |
| 4,854,821 | 8/1989 | Kernon et al. | 416/95 |
| 5,143,512 | 9/1992 | Corsmeier et al. | 415/115 |
| 5,211,533 | 5/1993 | Walker et al. | 415/115 |
| 5,310,319 | 5/1994 | Grant et al. | 416/220 |
| 5,415,526 | 5/1995 | Mercadante et al. | 416/190 |

Primary Examiner—John T. Kwon
Attorney, Agent, or Firm—Kenneth C. Baran

[57] ABSTRACT

A cooled rotor assembly for a gas turbine engine includes rotor blades (48) and a plurality of cover plates (86a) retained in the blade attachment slots (34) of a rotor disk (30). Each blade has a platform (46) with a trailing edge (58), and each cover plate includes at least one conduit (120, 126) for drawing leakage air from a plenum (102) in front of the disk and impinging that air against the platform trailing edges (58) to cool the tailing edges. In the preferred embodiment, each conduit (120) is defined by the rear face of a blade root (40) and a groove (122) cast into the cover plate. The invention makes productive use of leakage air by using that air to cool the platform trailing edges rather than allowing it to flow unbeneficially into the engine gaspath (24) in the vicinity of the platform leading edges (56).

3 Claims, 4 Drawing Sheets

COOLED ROTOR ASSEMBLY FOR A TURBINE ENGINE

TECHNICAL FIELD

This invention relates to gas turbine engines and particularly to a cooled rotor assembly for such an engine in which cooling air, which inevitably escapes from a cooling air flowpath, is redirected to cool a surface exposed to hot gases flowing through the engine's main gaspath.

BACKGROUND OF THE INVENTION

In modern gas turbine engines, a quantity of compressed air is extracted from the engine's compressor section and routed to the engine's turbine section where it is used to cool those components, such as blades and vanes, which are exposed to hot combustion gases flowing through the engine's main gaspath. The cooling of turbine components enables the attainment of higher gaspath temperatures and therefore improves the power output of the engine. However the extraction of air from the compressor also introduces an inefficiency since the turbine cannot completely recover the energy expended to compress the air. It is, therefore, important to minimize the amount of cooling air extracted from the compressor and to fully utilize that air which is extracted.

The cooling air is routed from the compressor to the turbine by way of one or more cooling air flowpaths. A typical cooling air flowpath includes a number of seals to minimize the leakage of cooling air from the flowpath and the accompanying efficiency penalty. Nevertheless, some cooling air inevitably leaks out of the flowpath. Since there is an efficiency penalty associated with having extracted this air from the compressor, it is desirable to put this leakage air to the best possible use and to do so without introducing significant complexity into the engine. It is equally desirable to avoid any significant increase in the cost of manufacturing the engine.

For one specific model of a turbine engine which suffers from the above described leakage problem, cooling air escapes from a cooling air flowpath and enters a plenum in front of a turbine disk. The majority of this leakage air flows out of the plenum, around the leading edges of the turbine blade platforms and into the main gaspath. Although this leakage air may cool the platform leading edges, it is far more essential to cool the trailing edges. Thus, the leakage air is not is used as productively as possible. Moreover, the leakage air flows into the gaspath with a significant radial velocity component rather than an axial velocity component which is required for the turbine to effectively recover energy from the air (thereby minimizing the inefficiency associated with having extracted the air from the compressor). A small portion of the leakage air also seeps into the gaspath in the vicinity of the trailing edges of the blade platforms. However this wailing edge leakage is ineffective for cooling the trailing edges since the quantity of air is small and its entry into the gaspath is unmanaged.

SUMMARY OF THE INVENTION

It is, therefore, an object of the invention to redirect turbine cooling air, which has leaked out of a cooling air flowpath, and to use the redirected leakage air for cooling a component exposed to the hot gases flowing through the engine's main gaspath.

It is a further object of the invention to accomplish the redirection and beneficial use of the leakage air while minimizing the complexity and cost of the engine.

According to the invention, cooling air, which has leaked out of a cooling air flowpath and into a plenum bounded in part by the front face of a rotor disk, is drawn out of the plenum and impinged upon the trailing edges of the turbine blade platforms.

In one embodiment of the invention a plurality of turbine blades and rear cover plates are retained in the attachment slots of a turbine rotor disk. The cover plates abut the rear faces of the turbine blade roots and include a series of essentially radially oriented grooves. The grooves cooperate with the rear faces of the blade roots to define conduits in the cover plates. The conduits encourage air which has leaked into a plenum in front of the rotor disk to flow out of the plenum and rearward through cooling air cavities radially inward of the blade roots. The leakage air enters the conduits and is impinged onto the tailing edges of the turbine blade platforms.

The primary advantage of the invention is that leakage air, which would otherwise flow unbeneficially into the gaspath in the vicinity of the platform leading edges, is diverted to the trailing edges where the need for cooling is greater. Moreover the leakage air is forcibly impinged upon the trailing edge to maximize the cooling effectiveness. Thus, the leakage air is used as productively and as beneficially as possible.

A second advantage of the invention is the reduction or elimination of the need to cool the platform trailing edges by flowing leakage air through minute passages in the interior of the trailing edges and discharging that air as a cooling film over the trailing edge external surfaces. Any reduction in the quantity of this internal and film cooling air improves engine efficiency. In the event that internal and film cooling is rendered completely unnecessary, the internal cooling passages need not be installed, thereby saving considerable expense in the manufacture of the blades.

The foregoing advantages and the features and operation of the invention will become more apparent in light of the following description of the best mode for carrying out the invention and the accompanying drawings.

BEST MODE FOR CARRYING OUT THE INVENTION

Figure 1:
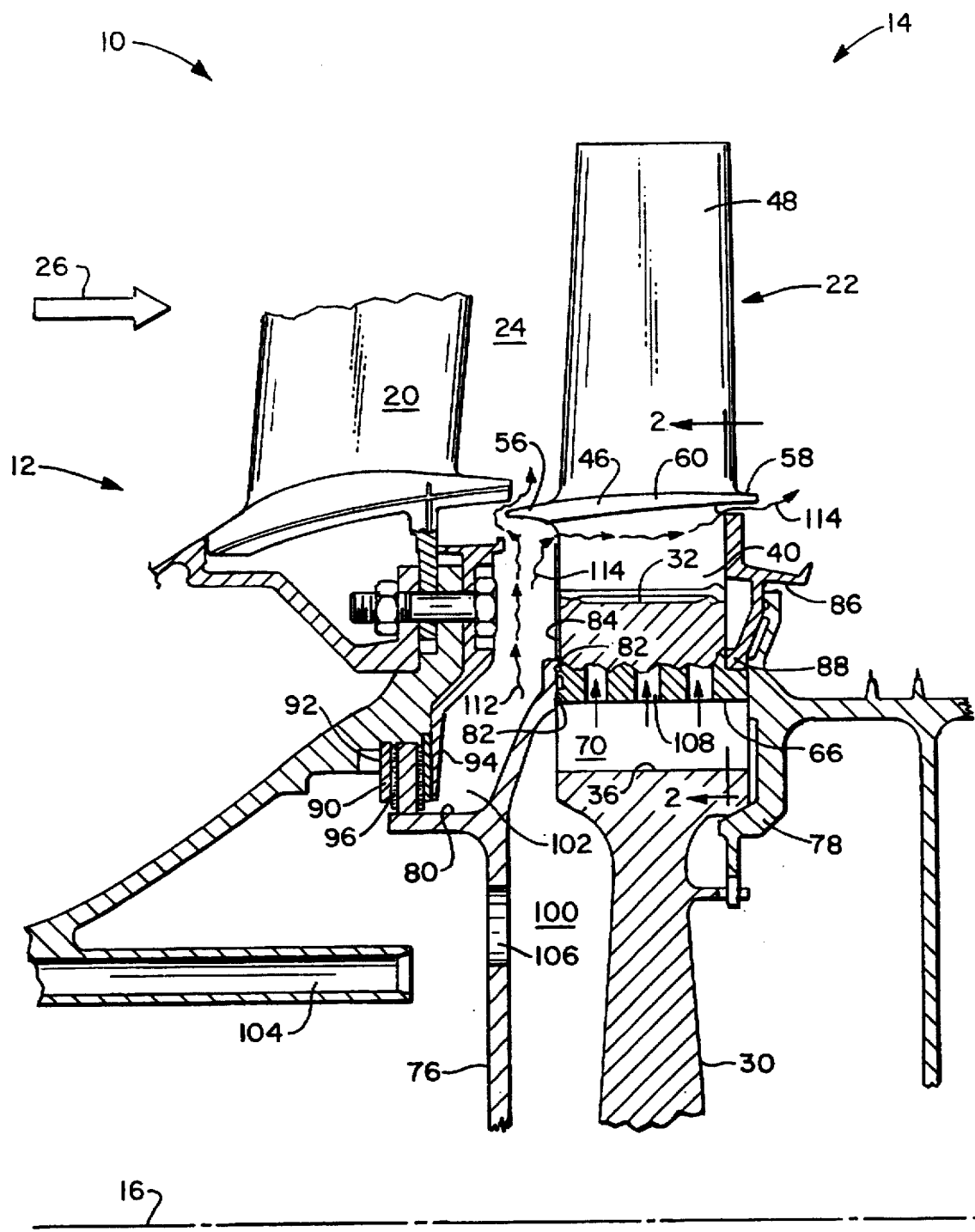
FIG. 1 is a cross sectional side view of the turbine section of a gas turbine engine illustrating the leakage of cooling into the engine's main gaspath in the vicinity of the leading and trailing edges of a turbine blade platform.
Figure 2:
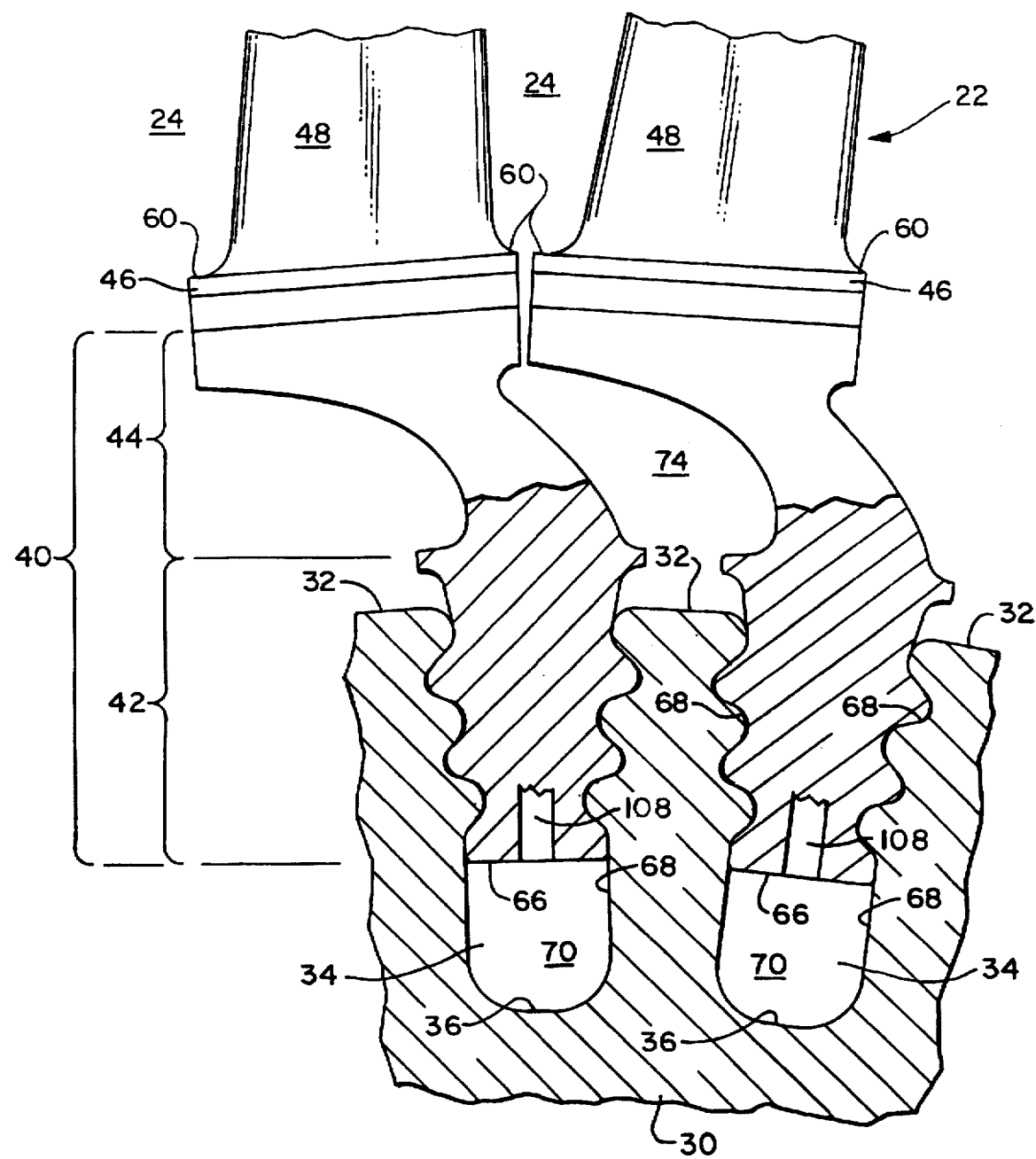
FIG. 2 is a view parallel to the engine axis taken essentially along the line 2—2 of FIG. 1 showing two representative turbine blades retained in a rotor disk.

Referring to FIGS. 1 and 2, the turbine 10 of a gas turbine engine includes a nonrotating stator assembly 12 and a cooled rotor assembly 14 rotatable about a central longitudinal axis 16. Aerodynamically contoured vanes and blades such as representative vane 20 and blade 22 extend radially across a main gaspath 24. The vanes and blades cooperate to recover energy from high temperature combustion products 26 flowing through the gaspath. The recovery of energy from the combustion products spins the rotor assembly about the axis, and the rotary motion is conveyed to and powers a compressor, not shown.

Examining the rotor assembly in more detail, a rotor disk 30 has an outer rim 32 and a plurality of fir tree shaped attachment slots 34 extending from the outer rim to an inner rim 36. Each rotor blade 22 has a root 40 comprising a fir tree shaped attachment 42 and a neck 44. The fir tree attachment engages the attachment slots in the disk to radially retain the blades. Each blade also includes a platform 46 for defining the inner boundary of the main gaspath and an airfoil 48 extending across the gaspath. Each platform has a leading edge 56, a trailing edge 58, and lateral edges 60 extending from the leading edge to the trailing edge.

When installed in the disk, the inner extremity 66 of each blade root cooperates with the sidewalls 68 of the attachment slots and the inner rim 36 to define a chamber 70. In addition, the outer rim 32, blade necks 44 and the platforms 46 of neighboring blades define a cavity 74 which may contain a damper, not shown, for damping undesirable vibration of the blades.

The rotor assembly also includes circumferentially extending front and rear sideplates 76, 78 which bear against the blade roots to axially retain the blades in the attachment slots. The front sideplate includes a cylindrical seal land 80 and a pair of circumferentially extending wire seals 82 at the interface between the sideplate and the front face of the blade roots. A bush seal 90 is axially trapped between a shoulder 92 on the stator assembly and a seal retainer 94 so that the seal bristles 96 engage the seal land 80. A plurality of non-airtight windage covers 84 is secured to the front face of the disk. A plurality of rear cover plates 86 each having a fir tree shaped base 88 are retained adjacent to the blades in the disk attachment slots and are axially trapped between the blades and the rear sideplate. The disk, sideplate 76 and wire seals 82 bound an inner plenum 100. The seal retainer 94, sideplate 76, blade platforms 46 and the front faces of the blade roots bound an annular outer plenum 102.

In order to attain the highest possible operating temperatures, and therefore the maximum possible engine power, it is customary to cool those turbine components directly exposed to the hot combustion products. Cooling air is extracted from the compressor, not shown, and delivered to the turbine blades and vanes by way of one or more cooling air flowpaths. One of these flowpaths is bounded, in part, by the brush seal 90 and includes a series of nozzles 104 which inject cooling air in the vicinity of apertures 106 in the front sideplate. The flowpath extends through the apertures, inner plenum 100, and chamber 70 so that the cooling air is fed into passages 108 in each blade. The passages extend into the airfoils and the blade platforms so that cooling air flowing through the passages cools the blades and platforms. As is well known, the cooling air may be discharged through cooling air holes, not shown, in the airfoils and platforms to form a protective cooling film over the blade and platform surfaces.

A portion of the air discharged from nozzles 104 inevitably leaks past the brush seal 90, and into outer plenum 102. Most of the air from the outer plenum is leading edge leakage air 112 which flows radially outward, around the leading edges 56 of the blade platforms and discharges into the main gaspath with a significant radial velocity component. The radial velocity component of this leading edge leakage air interferes with the recovery of energy therefrom. The balance of the air from the outer plenum is trailing edge leakage air 114 which flows past the windage covers 84, rearward through cavity 74, and seeps radially outward along the interface between the rear cover plate 86 and the rear faces of the blade roots 40.

On average, the temperature of the combustion gases 26 is lower downstream of the blades than upstream of the blades. The combustion gases also have a radial temperature gradient which changes, due to a radial component of gas flow, as the gases flow axially past the blades 22. As a result, the gaspath temperature is higher in the vicinity of the platform trailing edges 58 than in the vicinity of the platform leading edges 56. Therefore, although the is leading edge leakage air 112 flowing around the platform leading edges may provide some cooling thereof, it is more important to cool the trailing edges. The trailing edge leakage air 114 which seeps into the vicinity of the platform trailing edges is too insufficient in quantity and is too ineffectively directed to cool the trailing edges.

Figure 3:
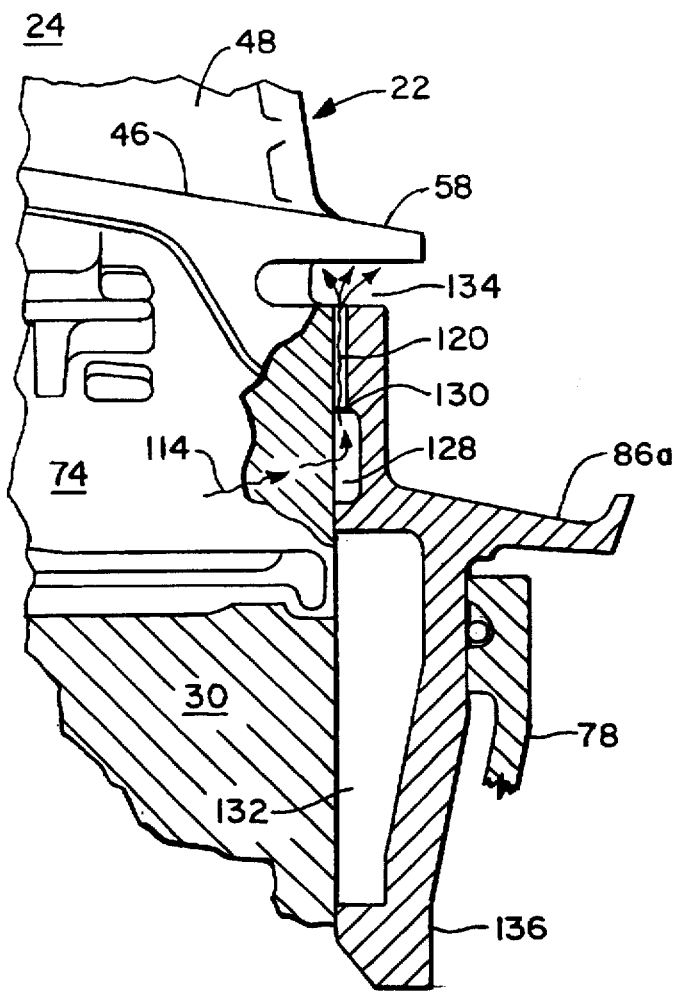
FIG. 3 is an enlarged view similar to FIG. 1 illustrating a cooling air conduit of the present invention formed by the rear face of a blade root and a groove in the abutting surface of a cover plate.
Figure 5:
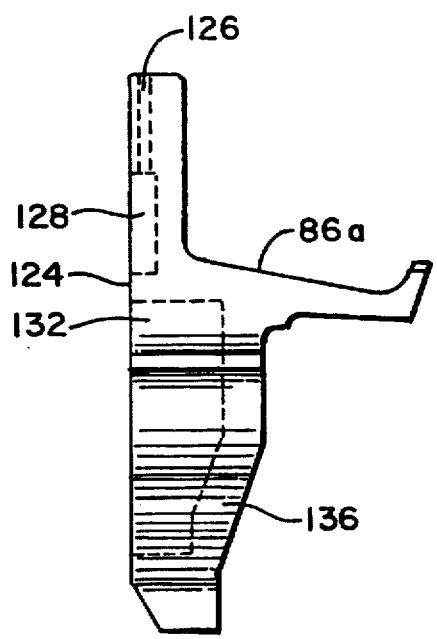
FIG. 5 is a side view of an alternative embodiment of an aft cover plate having fully bounded air passages.
Figure 4:
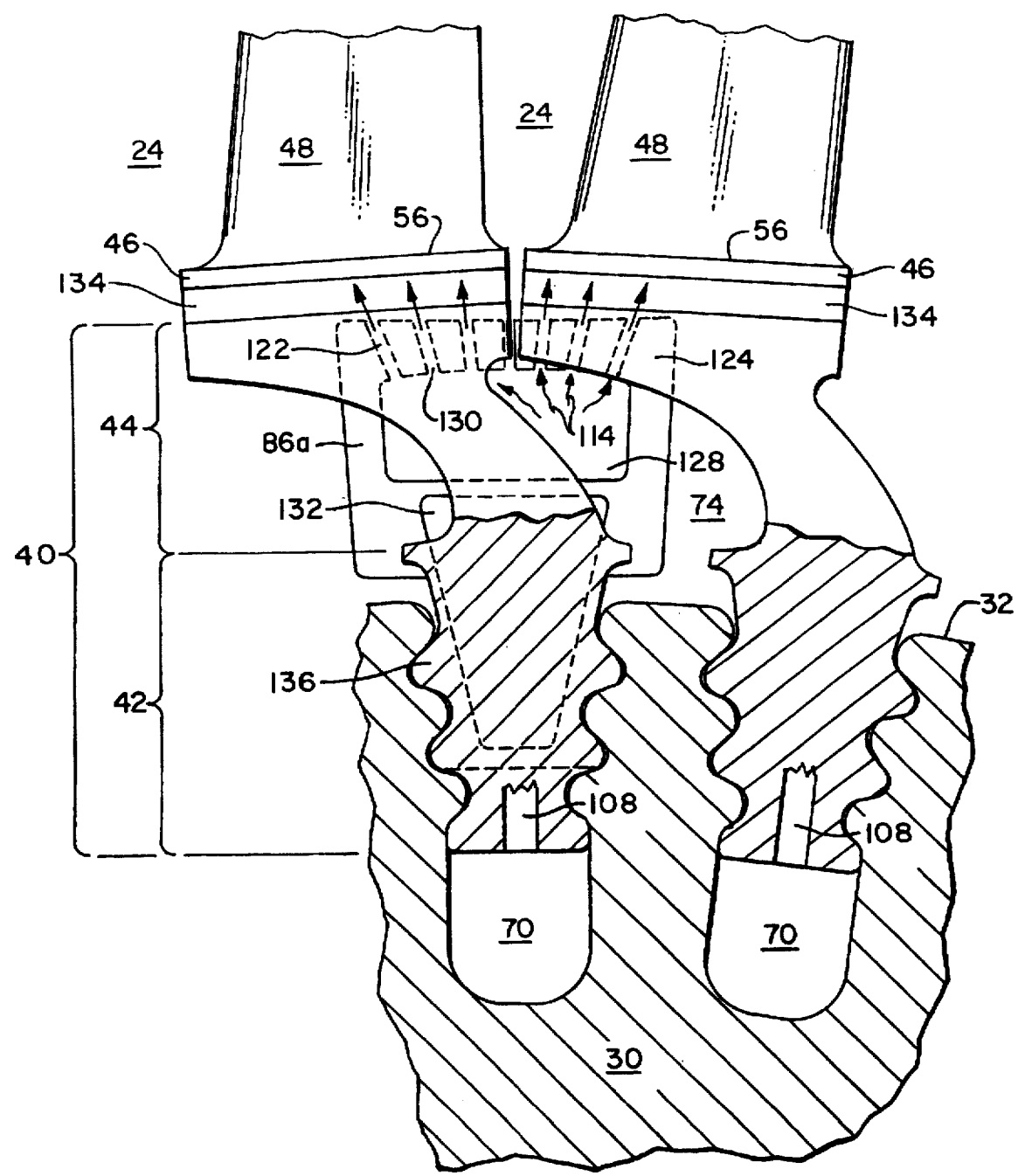
FIG. 4 is a view parallel to the engine axis showing the cover plate of FIG. 3 in relation to the blade roots and rotor disk.

Referring now to FIGS. 3–5 (and primarily to FIGS. 3 and 4), the cooled rotor assembly according to the present invention includes a plurality of cover plates 86a each having at least one conduit 120 for intentionally drawing a large percentage of the leakage air from outer plenum 102 and impinging it against the trailing edges 58 of the blade platforms. In the preferred embodiment there are multiple conduits for impinging the air against the trailing edge from one lateral edge of the platform to the other and each conduit is formed by the rear face of a blade root 40 and a groove 122 (best seen in FIG. 4) cast into abutting surface 124 of the cover plate 86a. Alternatively, the conduits could be fully bounded passages 126 machined (for example by electro-discharge machining or laser drilling) through the interior of the cover plate as shown in FIG. 5. This alternative embodiment may provide superior cooling but is considerably more expensive to produce than a cover plate having the cast grooves of the preferred embodiment.

The cover plate 86a also preferably includes a manifold 128 cast into the cover plate base for placing the intake end 130 of each conduit in flow communication with cavity 74. The manifold distributes the leakage air uniformly among the conduits and reduces the weight of the cover plate, an important consideration if the engine is used to power an aircraft. Additional weight savings is realized by casting a weight reduction cavity 132 into the base 136 of the cover plate.

In operation, the conduits 120 establish flow communication between cavities 74 and sub-gaspath region 134 radially inward of the platform trailing edges. Since the gas pressure is lower near the platform trailing edges than near the leading edges, leakage air from outer plenum 102 (FIG. 1) is discouraged from flowing radially outward and entering the gaspath unbeneficially in the vicinity of the platform leading edges. Instead, the pressure difference encourages most of the air to flow rearward, through cavities 74 and then radially outward through conduits 120. The leakage air is forcibly impinged on the platform trailing edges to augment the cooling provided by internal passages in the platform. As a result, the platform internal cooling flow may be reduced with an accompanying improvement in engine efficiency. In the limit, it may be possible to completely dispense with the internal cooling passages thereby considerably reducing the cost of manufacturing the blades and more than compensating for the minor expense of casting the grooves in the cover plate.

In summary, the rotor assembly according to the invention is characterized by a rear cover plate having conduits which divert most of the leakage air from plenum 102, leaving relatively little leakage air 112 to flow unproductively into the vicinity of the platform leading edges. Moreover, the conduits impinge the diverted leakage air against the blade platforms to improve the cooling thereof, thereby using the leakage air as beneficially as possible. By contrast, the absence of conduits in a conventional rotor assembly causes the quantity of leading edge leakage air 112 to vastly exceed the quantity of trailing edge leakage air 114. As a result, the majority of the leakage air cools the leading edge of the platform even though the trailing edge is the region exposed to higher temperatures.

I claim:

1. A cooled rotor assembly for a gas turbine engine including:

a disk with an outer rim, an inner rim and a plurality of blade attachment slots extending from the outer rim to the inner rim;

a plurality of rotor blades, each blade having a root and a platform with a leading edge, a trailing edge and lateral edges extending from the leading edge to the trailing edge, the blades being retained in the attachment slots so that the outer rim, the blade roots and the blade platforms define a plurality of cooling air cavities; and a plurality of cover plates retained in the blade slots, the cover plates having surfaces which abut the associated blade roots, the rotor assembly characterized in that each cover plate has at least one conduit for drawing leakage air from a plenum in front of the disk and for impinging the leakage air against the trailing edges of the blade platforms.

2. The cooled rotor assembly of claim 1 characterized in that each of the conduits is defined by the rear face of one blade root and a groove in the abutting surface of the cover plate.

3. The cooled rotor assembly of claim 1 or 2 characterized in that the cover plates include manifolds for placing the conduits in flow communication with the cavities.

* * * * *